J. N. HOVAS.
SHOCK ABSORBER.
APPLICATION FILED JULY 15, 1918.
1,294,467.
Patented Feb. 18, 1919.
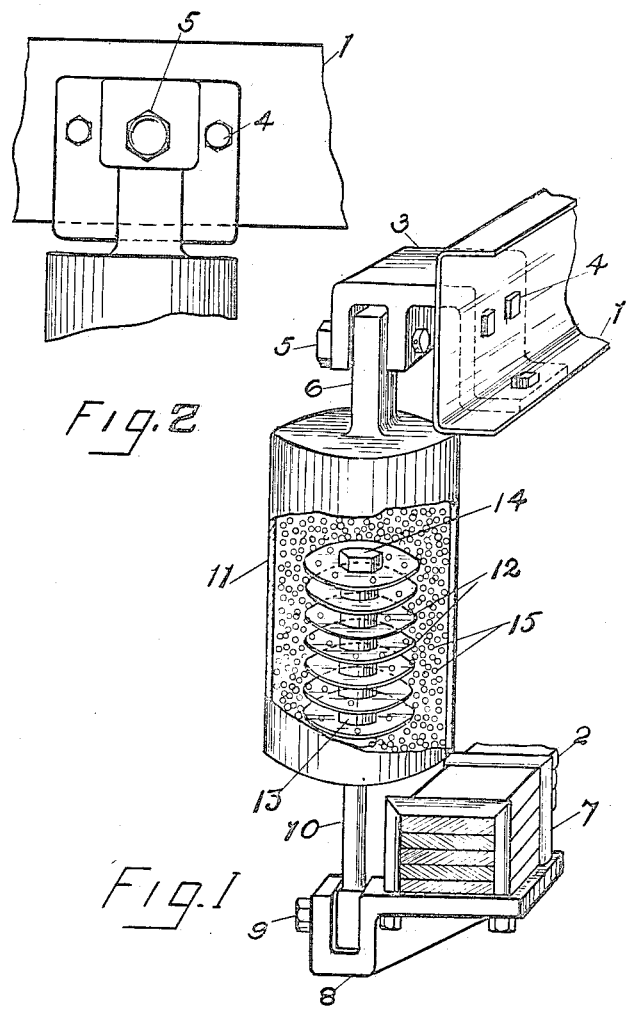

UNITED STATES PATENT OFFICE.

JOHN N. HOVAS, OF CHICAGO, ILLINOIS.

SHOCK-ABSORBER.

1,294,467.  Specification of Letters Patent.  Patented Feb. 18, 1919.

Application filed July 15, 1918. Serial No. 245,023.

*To all whom it may concern:*

Be it known that I, JOHN N. HOVAS, a citizen of the United States, residing at Chicago, in the county of Cook and State of Illinois, have invented certain new and useful Improvements in Shock-Absorbers, of which the following is a specification.

This invention relates to improvements in shock absorbers and its object is to provide a device of this class, adapted primarily for use upon vehicles, that is simple in construction, efficient in operation and cheap to manufacture. With the foregoing and other objects in view the invention consists in the combination and arrangement of parts to be hereinafter fully described, pointed out in the appended claims and illustrated in the accompanying drawing which forms a part of this specification and in which—

Figure 1 is a view of my improved shock absorber in elevation illustrating its application.

Fig. 2 is a fragmentary view of Fig. 1.

Like reference characters denote corresponding parts in both views.

The reference numerals 1 and 2 denote the frame and springs of an automobile to which my shock absorber may be applied. To the frame 1 I secure a bracket 3 by means of bolts 4, said bracket carrying a bolt 5 to which a lug 6 of my shock absorber is pivotally secured. To the U-bolts 7 that bind the springs 2 I secure a bracket 8 that carries a bolt 9 to which the plunger rod 10 is pivotally secured, said rod extending into the cylindrical container 11. Within the said container the plunger rod 10 is threaded and provided with a plurality of threaded disks 12 which are spaced apart by the collars 13 also threaded upon said rod, said plunger rod being provided with a head 14.

Within the container 11 I provide a filling of small metal balls 15, a number of which find their way between the disks 12 and serve to absorb the jolt and shock incident to the movement of the plunger and its disk due to travel of the vehicle. The container is fairly well filled with said metal balls so that the inclosed end of the plunger, as well as the said disks, is buried or embedded in the same. The action of the plunger, disks and metal balls serves effectually to absorb all shock incident to travel over rough roads.

What is claimed is:—

1. In a shock absorber, a container, a plunger carried by said container, spaced disks arranged upon said plunger within said container, and a metal-ball-filling for said container.

2. In a shock absorber, a container, a plunger carried by said container, spaced disks arranged upon said plunger within said container, and a metal-ball-filling for said container, said filler working freely between and about said disks and serving as a bank for said plunger.

3. In a shock absorber, a container, a threaded plunger adapted for movement through one end of said container, a head for the inclosed end of said plunger, disks threaded upon said plunger within said container, collars threaded upon said plunger between said disks, and a metal-ball-filling for said container adapted to pack about and between said disks.

In testimony that I claim the foregoing as my own I have hereto affixed my signature in the presence of two subscribing witnesses.

JOHN N. HOVAS.

Witnesses:
H. J. SANDERS,
A. S. NEWSBAM.